(12) United States Patent
Callou (10) Patent No.: US 8,474,761 B2
(45) Date of Patent: Jul. 2, 2013

(54) METHOD OF PILOTING A ROTARY WING DRONE HAVING MULTIPLE ROTORS

(75) Inventor: Francois Callou, Paris (FR)

(73) Assignee: Parrot, Paris (FR)

( * ) Notice: Subject to any disclaimer, the term of this patent is extended or adjusted under 35 U.S.C. 154(b) by 85 days.

(21) Appl. No.: 13/226,283

(22) Filed: Sep. 6, 2011

(65) Prior Publication Data

US 2012/0091260 A1  Apr. 19, 2012

(30) Foreign Application Priority Data

Sep. 15, 2010  (FR) ...................................... 10 57369

(51) Int. Cl.
*B64C 13/16* (2006.01)
*B64C 27/00* (2006.01)

(52) U.S. Cl.
USPC ........................................ 244/183; 244/17.13

(58) Field of Classification Search
USPC ................. 244/17.13, 17.23, 17.11, 177, 183
See application file for complete search history.

(56) References Cited

U.S. PATENT DOCUMENTS 3,665,465 A * 5/1972 Miller ............................ 244/188
3,916,688 A * 11/1975 Dendy et al. .................... 701/16
4,029,271 A * 6/1977 Murphy et al. ................ 244/180
4,551,804 A * 11/1985 Clark et al. .................... 244/181
6,595,742 B2 * 7/2003 Scimone ...................... 244/53 B
2004/0245378 A1  12/2004 Nonami et al.
2008/0114505 A1 * 5/2008 Ishiba ............................. 701/15

FOREIGN PATENT DOCUMENTS

WO  2010061099 A2  6/2010

* cited by examiner

*Primary Examiner* — Tien Dinh
*Assistant Examiner* — Richard R Green
(74) *Attorney, Agent, or Firm* — Haverstock & Owens LLP (57) ABSTRACT

This method implements a transition from i) moving state in which the drone is flying at speed and tilt angle that are not zero to ii) hovering state in which the drone has speed and tilt angle that are both zero. The method comprises: a) measuring horizontal linear speed, tilt angles, and angular speeds at the initial instant; b) setting stopping time value; c) on the basis of initial measurements and set stopping time, parameterizing a predetermined predictive function that models optimum continuous decreasing variation of horizontal linear speed as a function of time; d) applying setpoint values to a loop for controlling motors of the drone, which values correspond to target horizontal linear speed precalculated from said parameterized predictive function; and e) once hovering state has been reached, activating a hovering flight control loop for maintaining drone at speed and tilt angle that are zero relative to the ground.

4 Claims, 3 Drawing Sheets

METHOD OF PILOTING A ROTARY WING DRONE HAVING MULTIPLE ROTORS

FIELD OF THE INVENTION

The invention relates to rotary wing drones such as quadricopters and the like.

BACKGROUND OF THE INVENTION

Drones are provided with multiple rotors driven by respective motors that are independently controllable in order to control the drone in attitude and in speed.

A typical example of such a drone is the AR. Drone from Parrot SA, Paris, France, which is a quadricopter fitted with a set of sensors (altimeter, three-axis gyros, accelerometers). The drone also has a front camera picking up an image of the scene towards which the drone is heading, and a downward-looking camera picking up an image of the terrain being overflown.

The drone is controlled by the user by means of a remote control device that is connected to the drone via a radio link.

WO 2010/061099 A2 (Parrot SA) in particular describes such a drone and how it can be controlled by means of a telephone or a multimedia player having a touch screen and an accelerometer incorporated therein.

If the motors are controlled in such a manner as to cause the drone to tilt or "dive" nose-down (tilt with a pitching angle), then it will move forwards at a speed that increases with increasing tilt angle; conversely, if it takes up a "nose-up" position in the opposite direction, its speed is slowed down progressively and then reverses, going off rearwards. Similarly, titling about a roll axis (with the drone leaning to right or to left) causes the drone to move horizontally in linear manner to the left or to the right.

In general, the term "tilt" is used to mean the drone being tilted relative to a horizontal plane of a fixed terrestrial frame of reference, it being understood that the longitudinal and transverse components of its horizontal speed and its tilt about the pitching and roll axes respectively are intimately associated The drone is also provided with an automatic stabilization system that serves in particular to enable the drone to reach an equilibrium point automatically and, once the equilibrium point has been reached, it provides the corrections needed to maintain a point that is stationary, i.e. by correcting small variations of movement in translation due to external effects such as movements of the air. During this stage, sensor drift is estimated by trimming.

The inertial sensors (accelerometers and gyros) serve to measure fairly accurately the angular speeds and the attitude angles of the drone (i.e. the Euler angles describing the tilt of the drone relative to an absolute terrestrial frame of reference). The signals they deliver can thus be used for dynamically servo-controlling the thrust direction of the drone to the direction opposite to that of the disturbance or to the direction opposite to the piloting commands sent to the drone by the user.

The altimeter is an ultrasound telemeter located under the drone and it delivers an altitude measurement that enables the thrust force to be servo-controlled in order to stabilize the drone in height.

Linear speed in a horizontal plane (speed of the movement in translation of the drone as represented by two orthogonal components extending longitudinally and transversely in a horizontal plane of a terrestrial frame of reference) is evaluated by analyzing the image delivered by the downwardly-looking camera of the drone in combination with accelerometer data, using software that estimates movement from one image to the next in the scene picked up by the camera, with this estimated movement being subjected to a scale factor that is a function of the measured altitude. Various algorithms make it possible to determine in real time the horizontal speed with good accuracy, both for values that are close to the maximum speed of the drone, which is of the order of 8 meters per second (m/s), and for values that are very small, around the equilibrium point in a hovering flight configuration (in this configuration, the inexpensive accelerometers that are used generally suffer from too much noise to give a satisfactory estimate of the speed of the drone after double integration of the signal, so measuring speed by means of the camera makes it possible to compensate for the errors of these sensors).

More particularly, the invention relates to the transition:
from a state in which the drone is flying at a high speed (and thus with a non-zero tilt angle), referred to below as a "moving state", and defined by the piloting commands sent to the drone by the user;
to a state in which the drone is not moving, referred to below as a "hovering" state, in which the horizontal speed of the drone is zero and its tilt angle is likewise zero. In this state, the loop for automatically stabilizing the drone in hovering flight is activated in order to maintain this hovering state at a speed and an angle of inclination that are both zero, as explained above.

Such a transition occurs in particular when the user triggers a changeover from a controlled mode of piloting in which the drone maneuvers in response to commands applied by the user via the control appliance, to an autopilot mode in which the drone maneuvers solely on the basis of data picked up by its sensors, without intervention on the part of the user.

As explained in above-mentioned WO 2010/061099 A2, this transition occurs in particular when the user "lets go" the controls, i.e. takes the fingers off the touch screen of the appliance: under such circumstances, and for safety reasons, the drone is brought automatically into a hovering state of flight.

In order to perform this transition, the autopilot system applies a setpoint to the loop for controlling the motors of the drone in such a manner as to reach the zero target values for speed and for angle of tilt.

Nevertheless, if the zero target values for speed and for angle of tilt are applied directly as setpoints to the control loop, it is often observed that the drone takes quite a long time to reach the final hovering state after following a path that is long, and often after its speed has changed sign one or more times, i.e. the drone overshoots the fixed point, reverses, oscillates, etc., with this involving a stopping time (i.e. the time taken to reach the final hovering state and as measured from the beginning of the transition) that is not optimum when compared with a situation in which a skilled user directly controls the transition from the moving state to the hovering state.

OBJECT AND SUMMARY OF THE INVENTION

The object of the invention is to propose a method that enables this transition to be managed in a manner that is completely automatic and optimized, i.e. that takes place quickly, along a trajectory that is short, and without any change of sign in the speed of the drone or any oscillation of the drone, and thus in a minimum length of time for reaching the hovering state.

As explained above, the method of the invention is a method of performing a transition from: i) a moving state at an initial instant in which the drone is flying at a non-zero horizontal linear speed and is at a non-zero tilt angle relative to the horizontal, to ii) a hovering state at a final instant in which the drone has a horizontal linear speed and an angle of tilt that are both zero.

In characteristic manner, the method comprises the steps consisting in:

a) acquiring initial measurements representative of the components of the horizontal linear speed, of the tilt angles, and of the angular speeds at the initial instant;

b) setting a value for stopping time between the initial instant and the final instant;

c) on the basis of the initial measurements acquired in step a) and of the stopping time set in step b), parameterizing a predetermined predictive function that models optimum continuous decreasing variation in the horizontal linear speed as a function of time from the speed at the initial instant to a zero speed at the end of the set time;

d) generating setpoint values for a loop (26-40) for controlling the motors (34) of the drone, these setpoint values corresponding to a precalculated target horizontal linear speed, at a given instant, on the basis of the predictive function as parameterized in step c); and e) once the hovering state has been reached, activating a hovering flight control loop (26-40, 48-58) suitable for stabilizing the drone with a zero horizontal linear speed and a zero tilt angle relative to the ground.

The predetermined predictive function is advantageously a polynomial function, in particular a fourth order polynomial function, and the step c) of parameterizing this function is a step of determining the coefficients of the polynomial.

More precisely, the polynomial function may be a function of the following type:

$$u(t)=(T-t)^3*(au*t+bu)$$

$$v(t)=(T-t)^3*(av*t+bv)$$

where:

u(t) is one of the components of the precalculated target horizontal linear speed;

v(t) is the other component of the precalculated target horizontal linear speed;

T is the value of the stopping time set in step b); and au, bu, av, and bv are the coefficients of the polynomial as determined in step c).

The value of the stopping time set in step b) is a value that is preferably a function of the linear speed of the drone at the initial instant, and/or of the presence or absence of protective fairing installed on the drone. It may be independent of the vertical speed of the drone.

BRIEF DESCRIPTION OF THE DRAWINGS

There follows a description of an implementation of the method of the invention given with reference to the accompanying drawings in which the same numerical references are used from one figure to another to designate elements that are identical or functionally similar.

MORE DETAILED DESCRIPTION

The implementation of the invention is described below in the context of piloting a quadricopter such as the AR. Drone model from Parrot SA, Paris, France, as described in particular in the above-mentioned WO 2010/061099 A2, and in WO 2009/109711 A2 (describing an example of a system for automatic stabilization on the basis of information provided by an altimeter and a forward-looking camera), and FR 2 915 569 A1 (describing in particular the gyros and accelerometers used by the drone).

The drone has four coplanar rotors driven by motors that are controlled independently by an incorporated navigation and attitude control system.

The drone also includes a front camera giving an image of the scene towards which the drone is heading, and a downwardly-looking camera giving an image of the ground and also used in calculating horizontal speed in translation.

The drone is controlled by a remote control appliance constituted by an appliance having a touch screen that displays the image picked up by the front camera together with a certain number of symbols superposed thereon that enable controls to be activated merely by the user touching the touch screen with a finger. The appliance may in particular be a multimedia appliance or a personal digital assistant, e.g. a cell phone of the iPhone type or a multimedia player of the iPod Touch type (registered trademarks of Apple Inc., USA), which appliances incorporate the various sensing members needed for detecting piloting commands and for both-way data exchange with the drone via a local network wireless connection of the Wi-Fi (IEEE 802.11) or Bluetooth (registered trademarks) type.

Piloting the drone consists in maneuvering it by:

a) turning about a pitching axis in order to move forwards or rearwards; and/or b) turning about a roll axis in order to shift to the left or to the right; and/or c) turning about a yaw axis in order to cause the main axis of the drone to pivot to the right or the left and thus to pivot the pointing direction of the front camera and the forward direction of the drone; and d) moving upwards or downwards in translation by changing the "throttle" setting, so as respectively to reduce or increase the altitude of the drone.

When piloting commands are applied directly by the user from the remote control appliance (piloting in a "reactive" mode), the commands a) and b) for pivoting about the pitching and roll axes are obtained in intuitive manner by tilting the appliance; for example, in order to cause the drone to move forwards, it suffices to tilt the appliance forwards about the pitching axis, and in order to shift to the right it suffices to tilt the appliance to the right about the roll axis, etc.

The commands c) and d) result from actions applied by the user making finger contact with specific corresponding zones of the touch screen.

Figure 1:
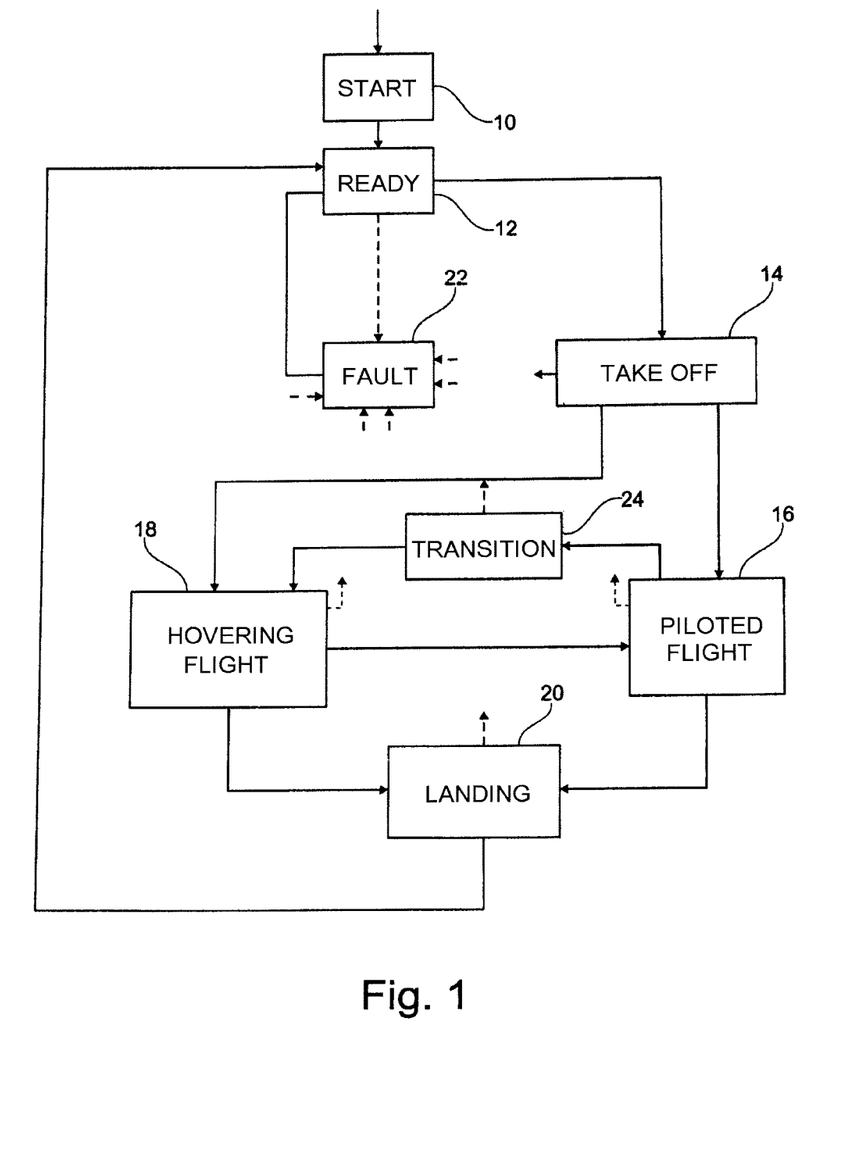
FIG. 1 is a state diagram showing the various functional configurations between which the drone can pass.

FIG. 1 is in the form of a state diagram showing the various functional configurations in which the drone can be found.

Immediately after switching on and performing a certain number of initialization steps (block 10), the drone is in a "ready" state (block 12) with its motors ready to start.

A command sent by the user causes the motors to be put into operation and the drone to take off (block 14). Thereafter, two main modes of operation are possible.

In a first or "piloted flight" mode of piloting (block 16), the drone is operated directly by the user, using, as explained above a combination of:

- firstly signals issued by the tilt detector of the appliance: for example in order to cause the drone to move forwards the user tilts the appliance about the corresponding pitching axis, and in order to move to the right or the left the user tilts the same appliance relative to the roll axis; and
- secondly commands that are available on the touch screen, in particular "up/down" (corresponding to a throttle control) and "turn right/left" (cause the drone to pivot about a yaw axis).

The other mode of piloting (block 18) is an automatic mode making use of the independent system for stabilizing hovering flight. This autopilot mode is activated in particular:

- at the end of the takeoff stage;
- as soon as the user takes the piloting finger off the touch screen of the appliance; or
- in the event of the radio link between the appliance and the drone being interrupted.

Flight, whether piloted or hovering, comes to an end by passing to a landing state (block 20) after pressing on a specific control of the appliance or in the event of the battery being low. Passing into this state causes the speed of rotation of the motors to be reduced and gives rise to a corresponding reduction in altitude. Once contact with the ground has been detected, the state returns once more to the "ready" state of block 12.

A fault state (block 22) is also provided that corresponds to an emergency state in the event of an anomaly being detected, and it causes the motors to be stopped immediately. This fault state may be reached from any of the above-described states, in particular in the event of a motor fault (a rotor being blocked), a software anomaly, or as a result of the accelerometer detecting an impact.

The invention relates more particularly to the transition (block 24) from piloted flight (moving state, block 16) to stationary flight (hovering state, block 18): the idea is to manage this transition progressively so as to enable the drone to pass from the moving state in which it is moving with non-zero tilt and thus with a horizontal speed that may be relatively high, to the hovering state in which it is stationary and is maintained in a fixed position by the autopilot and stabilization system, with this taking place in a minimum amount of time and without any horizontal speed reversal.

To this end, the invention proposes precalculating optimum commands and applying appropriate corresponding setpoints to the autopilot system throughout the transition stage.

When the user lets go the controls in order to trigger passage from piloted flight to hovering flight, immediately applying a speed command of zero is not the best way of stopping the drone, as explained above.

Starting from initial states of the drone (horizontal speed and tilt angles), an optimum angle command is calculated for bringing the speed and the tilt angle of the drone to zero in minimum time. For this purpose, the behavior of the drone is previously identified by a transfer function representing the real angular response of the drone to a setpoint; this makes it possible to predict its behavior and to apply the optimum setpoint for stopping the drone in minimum time.

Furthermore, planning the transition from piloted flight to hovering flight ensures that there is no overshoot of the setpoint, i.e. that the drone reaches zero speed without its speed changing sign, i.e. throughout the stopping procedure the drone continues to travel in the same direction and never reverses.

It should be observed that this planning of the transition from piloted flight to hovering flight acts on the linear horizontal speed components of the drone independently of its vertical speed (which may be zero or may be modified by the user).

It should also be observed that the inverse transition, from hovering flight (block 18) to piloted flight (block 16) does not raise any particular difficulties insofar as the initial state is a state of zero speed and tilt, so it suffices to apply as setpoint values for speed or tilt the target values as defined by the commands applied by the user.

Figure 2:
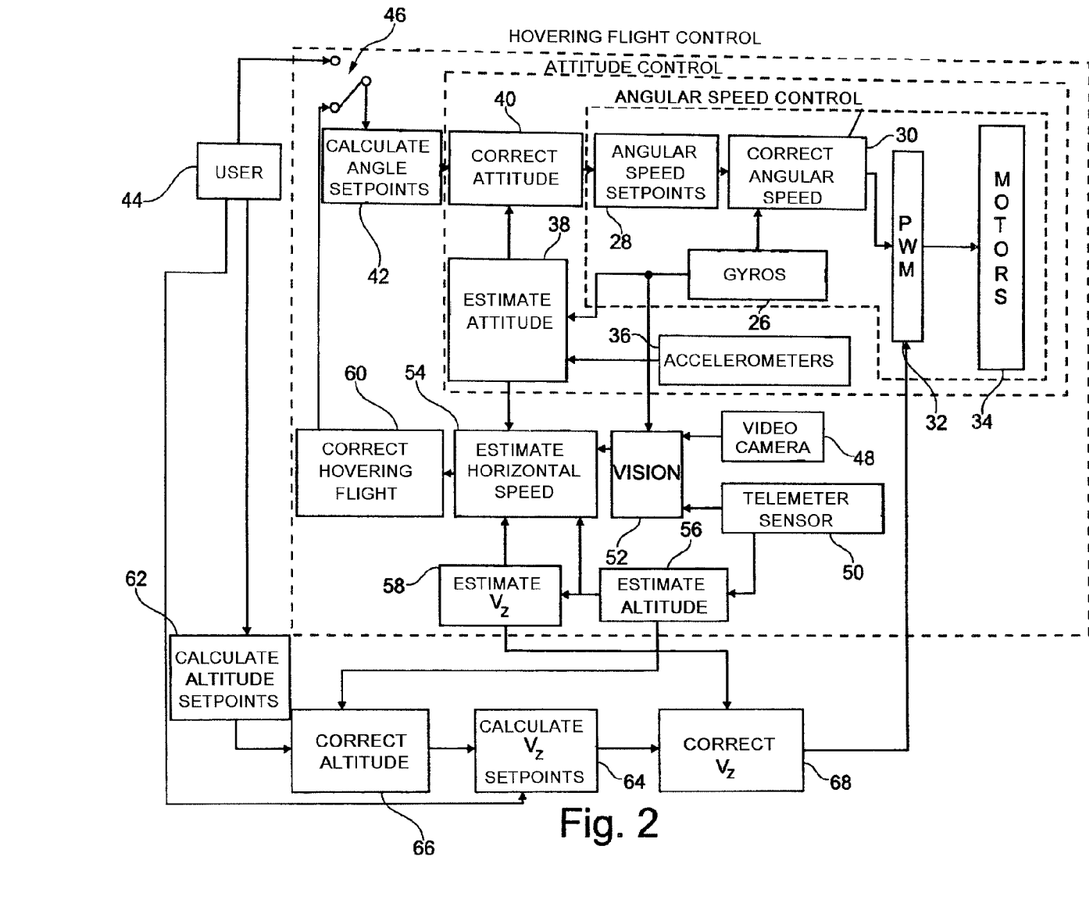
FIG. 2 is a block diagram of various sensing and control members and also of the autopilot of the drone.

FIG. 2 is a functional block diagram of the various sensing and control members and of the autopiloting of the drone. Nevertheless it should be observed that although the diagram is in the form of interconnected circuits, the various functions are implemented essentially by software, and that the diagram is merely for illustrative purposes.

The piloting system involves several nested loops for controlling the angular speed and the attitude of the drone and for stabilizing hovering, and also for controlling variations of altitude either automatically or in response to a command from the user.

The inner-most loop, the loop for controlling angular speed, makes use both of the signals provided by gyros 26 and of a reference constituted by angular speed setpoints 28, this data being applied as input to an angular speed correction stage 30. This stage 30 drives a stage 32 for controlling the motors 34, in particular by using a pulse width modulation (PWM) technique, so as to control independently the speeds of the various motors in order to correct the angular speed of the drone by the combined action of the rotors driven by the motors.

The angular speed control loop is nested within an attitude control loop that operates on the basis of information delivered by the gyros 26 and by accelerometers 36, this data being applied as input to an attitude estimator stage 38 having its output applied to a proportional-integral (PI) type stage 40 for correcting attitude. The stage 40 outputs angular speed setpoints to the stage 28, likewise derived from angle setpoints generated by a circuit 42, either from data generated internally by the autopilot of the drone while it is in a hovering flight state (block 18 of FIG. 1) or in a transition state between piloted flight and hovering flight (block 24), or else from commands directly applied by the user 44 when the drone is in the piloted flight configuration (block 16 in FIG. 1), with the selection of one or other of these options being represented by a switch 46.

To summarize, on the basis of the error between the setpoint (either applied by the user or else generated internally by the autopilot) and the angle measurement as given by the attitude estimator circuit 38, the attitude control loop (circuits 26 to 40) calculates an angular speed setpoint using the PI corrector of the circuit 40. The angular speed control loop (circuits 26 to 34) then calculates the difference between the above angular speed setpoint and the angular speed as actually measured by the gyros 26, and the loop uses this information to calculate the speed-of-rotation setpoints (and thus upward force setpoints) for delivery to the various motors of the drone in order to implement the maneuver as initially requested by the user, or else as planned by the autopilot.

The attitude control loop is itself nested within a hovering flight control loop for autopilot mode operation in which the setpoints applied by the user are replaced by signals that are generated internally. The vertical video camera 48 and the telemeter sensor 50 acting as an altimeter deliver data that is applied to a processor circuit 52 that also receives data from the gyros 28 in order to apply the corrections needed for estimating horizontal speed, as calculated by the circuit 54. This horizontal speed estimate may be corrected by an estimate of vertical speed as given by a circuit 58 on the basis of an altitude estimate delivered by the circuit 52 that receives information from the telemeter sensor 50.

The horizontal speed as estimated by the circuit 54 serves to enable the circuit 60 to calculate speed setpoints in the manner described below, which setpoints are subsequently applied as inputs to the attitude control loop, after being transformed into angle setpoints by the circuit 42.

To summarize, when the autopilot is activated, the setpoints sent directly by the user 44 are replaced by setpoints that are generated internally by the loop for controlling hovering flight (circuits 28 to 60), which loop calculates setpoints that are sent to the attitude control loop (circuits 28 to 34) in order to bring the speed of the drone to zero or in order to maintain it in a configuration in which both speed and tilt are zero.

Concerning the vertical movements of the drone, the user 44 either applies a climb speed setpoint ($V_z$) that is applied directly to a circuit 64, or else an altitude setpoint that is applied to a circuit 62 that uses a circuit 66 to calculate a climb speed setpoint on the basis of the altitude estimate as produced by a circuit 56.

In either case, the climb speed (as set or as calculated) is applied to a circuit 68 that compares the setpoint climb speed $V_z$ with the corresponding estimated speed delivered by the circuit 58, and correspondingly modifies the motor control data (circuit 32) so as to increase or reduce the speeds of rotation of all of the motors simultaneously in order to minimize the difference between the setpoint climb speed and the measured climb speed.

In a manner characteristic of the invention, when the drone is in a transition state (block 24 in FIG. 1) that is intermediate between the piloted flight state 16 and the hovering flight state 18, the attitude control setpoint is not a zero attitude setpoint (i.e. and thus a zero speed setpoint), but rather a setpoint that is precalculated as a function of the predictable behavior of the drone in such a manner as to minimize the transition and minimize the time needed for reaching the hovering state.

There follows a description of the way in which the setpoints for controlling the motors of the drone are determined during the transition stage from piloted flight to hovering flight.

The speed components in horizontal translation are written u and v (u in the forward direction of the drone and v in the transverse direction), and the speed in vertical translation is written w, all three speed components being expressed in a frame of reference associated with the drone (and thus independent of any angle of tilt of the drone relative to the terrestrial frame of reference).

Each of the four propellers i of the drone (for i=1, . . . , 4) exerts a torque $\Gamma_i$ and an upward thrust force $F_i$ proportional to the square of the speed of rotation $\omega_i$ of the motor:

$$\begin{cases} F_i = a\omega_i^2 \\ \Gamma_i = b\omega_i^2 \end{cases}$$

The fundamental relationships of dynamics are applied in projection into the moving frame of reference of the drone, thereby obtaining the following three equations:

$$\dot{u} = (rv - qw) - g\sin\theta - C_x u$$
$$\dot{v} = (pw - ru) + g\sin\varphi\cos\theta + C_y v$$
$$\dot{w} = (qu - pv) + g\cos\varphi\cos\theta - \frac{1}{m}\sum_{i=1}^{4} a\omega_i^2$$

(equations 1-3)

where:
p, q, and r are the angular speeds about the three axes;
g is the acceleration due to gravity;
φ and θ are the two angles (Euler angles) defining the tilt of the drone relative to the horizontal;
$C_x$ and $C_y$ are the coefficients of resistance to movement along the two horizontal axes (representing the friction forces to which the drone is subjected);
a is a coefficient relating thrust and climb speed to the speed of rotation ω; and
m is the mass of the drone.

The dynamic moment of inertia theorem is applied in the same manner to the system, still in projection into the moving frame of reference, giving rise to the following three equations:

$$I_x\dot{p} + qr(I_z - I_y) = la(\omega_2^2 - \omega_4^2)$$
$$I_y\dot{q} + pr(I_x - I_z) = la(\omega_1^2 - \omega_3^2)$$
$$I_z\dot{r} + pq(I_y - I_x) = b(\omega_1^2 - \omega_2^2 + \omega_3^2 - \omega_4^2)$$

(equations 4-6)

where:
$I_x$, $I_y$, and $I_z$ are parameters representing the moments of inertia of the drone about the three axes, and l is the distance between the motor and the center of gravity of the drone.

In these equations, the first term of the left-hand side corresponds to the dynamic moment of inertia of the system, the second term represents the contribution of Coriolis forces to the dynamic moment of inertia, and the right-hand side corresponds to the moments exerted by the climb forces $F_i$ and the torques $G_i$ created by the propellers of each of the rotors.

Finally, the following relationships involving the three Euler angles φ, θ, and ψ also apply:

$$\dot{\varphi} = p + (q\sin\varphi + r\cos\varphi)\tan\theta$$
$$\dot{\theta} = q\cos\varphi - r\sin\varphi$$
$$\dot{\psi} = \frac{q\sin\varphi + r\cos\varphi}{\cos\theta}$$

(equations 7-9)

The behavior of the system is thus described by a total of nine equations in nine unknowns.

In the vicinity of the equilibrium point, with the drone hovering horizontally (zero speed and tilt), the following applies:

$$u = v = w = \theta = \varphi = 0$$

Equations 1-9 become:

$$g = \frac{1}{m}\sum_{1}^{4} a\omega_i^2,$$

$$p=q=r=0, \omega_1=\omega_3, \omega_2=\omega_4, \omega_1=\omega_2$$

Thus, in the vicinity of the equilibrium point:

$$\omega_1 = \omega_2 = \omega_3 = \omega_4 = \frac{1}{2}\sqrt{\frac{mg}{a}} = \omega_0$$

Writing $w_i = \omega_i - \omega_0$ for $i=1, \ldots, 4$, and linearizing above equations 1 to 9 to the first order about the equilibrium point, gives rise to the following linearized system of equations:

$$\begin{cases} \dot{u} = -g(\theta) - Cx*u \\ \dot{v} = g(\varphi) + Cy*v \\ \dot{w} = -\frac{2a\omega_0}{m}(w_1 + w_2 + w_3 + w_4) \\ \dot{p} = \frac{la\omega_0}{I_x}(w_2 - w_4) \\ \dot{q} = \frac{la\omega_0}{I_y}(w_1 - w_3) \\ \dot{r} = \frac{b\omega_0}{I_z}(w_1 + w_3 - w_2 - w_4) \\ \dot{\varphi} = p \\ \dot{\theta} = q \\ \dot{\psi} = r \end{cases} \quad \text{(equations 10-18)}$$

This produces a model of the behavior of the drone, which model is used for predicting the behavior of the drone during the transition stage, and is applied during said stage.

The following step consists in defining the optimum trajectory during this stage.

The transition stage consists in passing from the state $$\begin{pmatrix} u \\ \Theta \\ q \\ v \\ \varphi \\ p \\ \psi \\ r \end{pmatrix} \neq \vec{0}$$

to the state $$\begin{pmatrix} u \\ \Theta \\ q \\ v \\ \varphi \\ p \\ \psi \\ r \end{pmatrix} = \vec{0}$$

in such a manner as to reach the hovering state in a minimum amount of time.

The speeds u and v should be brought progressively to zero by defining the shape of a target trajectory (trajectory planned on the basis of the model), and by applying setpoints to the autopilot that enable it to follow this target trajectory as closely as possible.

Along each of the axes, the system of equations possesses two initial conditions: $u \neq 0$ and $\theta \neq 0$, and two final conditions: $u=0$ and $\theta=0$ (and likewise: $v \neq 0$, $\phi \neq 0$ and $v=0$, $\phi=0$).

It is therefore necessary to have a polynomial of fourth order in order to be able to solve the system.

Use is made herein of a polynomial in t (the time parameter) and of the fourth order:

$$u(t) = (T-t)^3 * (au*t + bu)$$

$$v(t) = (T-t)^3 * (av*t + bv) \quad \text{(equations 19-20)}$$

These polynomials correspond to the target speed that is to be imparted to the drone in order to reach the hovering state in a length of time T that is set in advance (it is explained below how it is possible to determine this stopping time as a function of flight conditions at the initial instant).

In order to obtain the polynomial, it is necessary to determine the following two pairs of coefficients (au, bu) and (av, bv).

From the initial conditions, the following are obtained:

$$u(0) = (T)^3 * bu$$

$$v(0) = (T)^3 * bv$$

Whence:

$$bu = \frac{u(0)}{(T)^3} \quad \text{(equations 21-22)}$$

$$bv = \frac{v(0)}{(T)^3}$$

And it can be shown that the following are obtained in the same manner:

$$au = \frac{1}{T^3} * \left(g*\theta(0) + Cx*u(0) - 3*\frac{u(0)}{T}\right) \quad \text{(equations 23-24)}$$

$$av = \frac{1}{T^3} * \left(g*\varphi(0) + Cy*v(0) - 3*\frac{v(0)}{T}\right)$$

It is thus possible to parameterize each of the polynomials of equations 19 and 20 unambiguously, thereby making it possible to obtain the two components u or v of the horizontal speed at an arbitrary instant t as a function of: the time T set for stopping, the initial speeds u(0) and v(0), and the initial tilt angles $\phi(0)$ and $\theta(0)$.

Figure 3:
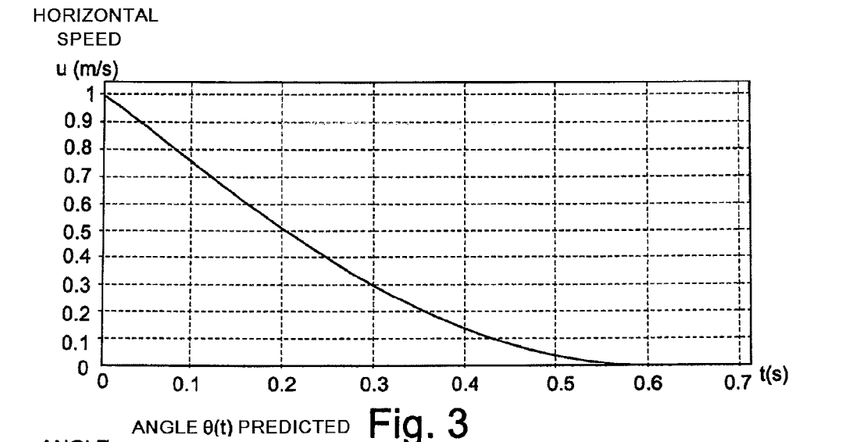
FIG. 3 is a characteristic curve describing, as a function of time, the speed as precalculated by the predictive function of the invention.

FIG. 3 shows the shape of the curve giving the speed components u(t) as defined by the polynomial relationship of equation 19, with T=0.7 seconds (s) and for initial conditions u(0)=1 m/s and θ(0)=0°, thereby giving the calculated parameters au=6.0479 and bu=2.9155.

It should be observed that the speed decreases monotonically (i.e. without reversal) from the initial speed of 1 m/s down to a speed of zero, at the end of the set time T=0.7 s.

It should also be observed that the slope of the tangent to the curve in the vicinity of the end point (T=0.7 s) is zero, which justifies the degree of the polynomial.

Once the target horizontal speed has been determined, it is appropriate to determine the corresponding angle setpoint to be applied at each instant t to the attitude control loop of the drone (setpoint delivered at the output from circuit 42 in FIG. 2).

The angle transfer function of the drone is previously identified and thus its behavior in the face of an angle setpoint is known.

After determining au, av, bu and bv as a function of initial conditions as measured by the various sensors of the drone and as a function of the set time T, the following values are calculated for each instant t: u(t), du(t)/dt, $d^2u(t)/dt^2$, and $d^3u(t)/dt^3$, as are: v(t), dv(t)/dt, $d^2v(t)/dt^2$, and $d^3v(t)/c/t^3$.

By using the following two transfer functions:

$$\frac{\theta(p)}{\theta ref(p)} = \frac{75/90}{\frac{p \wedge 2}{90} + \frac{12}{90} * p + 1} \quad \text{(equations 25-26)}$$

$$\frac{\varphi(p)}{\varphi ref(p)} = \frac{60/90}{\frac{p \wedge 2}{90} + \frac{12}{90} * p + 1}$$

where p is the complex variable of the Laplace transform, two differential equations are obtained that give the value of the setpoint angle at each instant:

$$\theta ref(t) = \frac{1}{75} * (\ddot{\theta}(t) + 12 * \dot{\theta}(t) + 90 * \theta(t)) \quad \text{(equations 27-28)}$$

$$\varphi ref(t) = \frac{1}{60} * (\ddot{\varphi}(t) + 12 * \dot{\varphi}(t) + 90 * \varphi(t))$$

The equations of physics also give:

$$\dot{u}(t) = -g * \theta - Cx * u(t)$$

$$\Leftrightarrow \theta = -\frac{1}{g}(\dot{u}(t) + Cx * u(t))$$

$$\dot{v}(t) = g * \varphi + Cy * v(t)$$

The looked-for values u(t) and v(t) are given by the previously-calculated polynomials of equations 19 and 20. By successive differentiations, the following are obtained: θ(t), θ̇(t), θ̈(t), and thus the setpoint θ_ref(t) is obtained for application to the drone attitude control loop (with the same applying for the angle φ. This control is optimal for stopping the drone in the set time.

Figure 4:
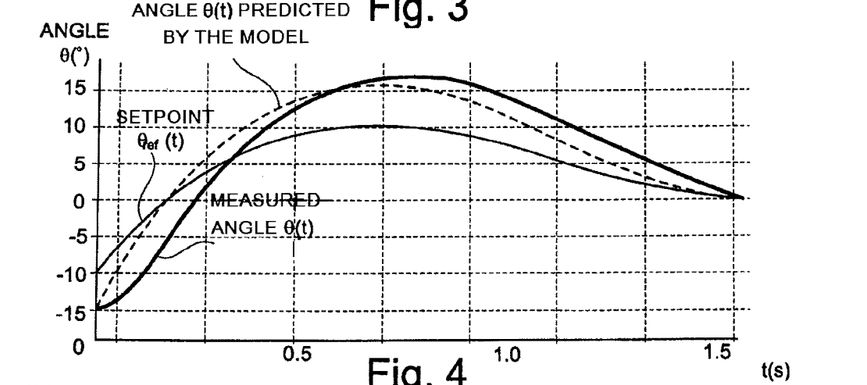
FIG. 4 shows the results of tests giving the value of the angle setpoint applied to the servo-control loop of the drone, the angle of inclination as predicted by the model, and the inclination as actually measured.
Figure 5:
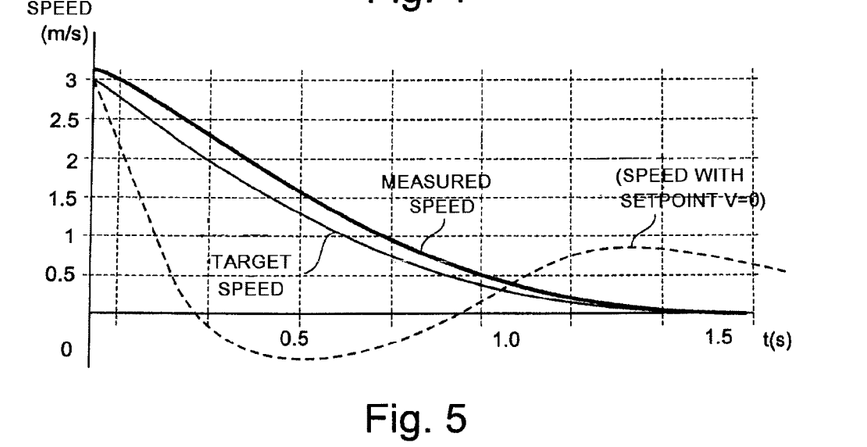
FIG. 5 shows the results of tests giving the speed predicted by the model, the speed actually measured, and the shape of the speed curve that would have been obtained by applying a speed setpoint of zero continuously and from the beginning.

FIGS. 4 and 5 show test results achieved in flight for an initial speed of about 3 m/s, an initial angle of −15°, and a set stopping time of 1.5 s.

FIG. 4 shows variations in the tilt angle θ(t) as predicted by the model, in the same angle as actually measured (which turns out to be very close to the predicted angle), and in the setpoint angle θ_ref(t) for application to the drone attitude control loop in order to obtain the angle predicted by the model.

FIG. 5 shows the variations in the target speed u(t) given by the polynomial function, and in the speed as actually measured (which turns out to be very close to the target speed). This figure also shows the shape that would have been observed for the speed curve if, instead of applying a regularly decreasing target speed, a zero speed setpoint had been applied immediately from the beginning of the transition stage.

In FIGS. 4 and 5, it can be seen that, at the end of the set stopping time, the speed and also the angle reach zero without overshoot, and thus without any change in the sign of the speed, i.e. without the drone reversing after going beyond the hover point (as happens when a zero speed setpoint is used, as shown in dashed lines in FIG. 5).

The set stopping time is advantageously a parameter that is a function of the flight conditions of the drone at the initial instant.

In particular, it is possible to select a stopping time as a function of the initial speed of the drone: the faster the initial speed of the drone, the longer the set stopping time.

In the same manner, the drone may fly with or without impact-protection fairing. Flight with fairing makes the moment of inertia of the drone much greater, thereby requiring more power for control purposes; the overall response time of the system is thus slowed down, so the set stopping time needs to be longer.

By way of example, stopping times may be selected as a function of these two parameters in application of the following table:

| Initial speed | With fairing | Without fairing |
| --- | --- | --- |
| $V_0 < 3$ m/s | 1.5 s | 0.7 s |
| 3 m/s $< V_0 <$ 6 m/s | 2.2 s | 0.7 s |
| $V_0 > 6$ m/s | 2.4 s | 1.5 s |

These values have been obtained experimentally, and they optimize stopping time while maintaining an altitude that is constant.

What is claimed is:

1. A method of controlling a rotary-wing drone having multiple rotors driven by respective individually-controllable motors for controlling the drone in attitude and in speed,
the method being a method for implementing a transition:
from a moving state at an initial instant in which the drone is flying with a non-zero horizontal linear speed and a non-zero angle of tilt relative to the horizontal;
to a hovering state at a final instant in which the drone has a zero horizontal linear speed and a zero angle of inclination;
the method being characterized by the steps consisting in:
a) acquiring initial measurements representative of the components of the horizontal linear speed, of the tilt angles, and of the angular speeds at the initial instant;
b) setting a value for stopping time between the initial instant and the final instant;
c) on the basis of the initial measurements acquired in step a) and of the stopping time set in step b), parameterizing a predetermined predictive function that models optimum continuous decreasing variation in the horizontal linear speed as a function of time from the speed at the initial instant to a zero speed at the end of the set time;

d) generating setpoint values for a loop for controlling the motors of the drone, these setpoint values corresponding to a precalculated target horizontal linear speed, at a given instant, on the basis of the predictive function as parameterized in step c); and e) once the hovering state has been reached, activating a hovering flight control loop suitable for stabilizing the drone with a zero horizontal linear speed and a zero tilt angle relative to the ground;

wherein the predetermined predictive function is a polynomial function, and the step c) of parameterizing the function is a step of determining the coefficients of the polynomial, and further wherein the polynomial function is a function:

$u(t) = (T-t)^3 * (au*t + bu)$ $v(t) = (T-t)^3 * (av*t + bv)$ where:
- u(t) is one of the components of the precalculated target horizontal linear speed;
- v(t) is the other component of the precalculated target horizontal linear speed;
- T is the value of the stopping time set in step b); and
- au, bu, av, and bv are the coefficients of the polynomial as determined in step c).

2. The method of claim 1, wherein the value for the stopping time set in step b) is a value that is a function of the horizontal linear speed of the drone at the initial instant.

3. The method of claim 1, wherein the value of the stopping time set in step b) is a value that is a function of the presence or absence of protective fairing installed on the drone.

4. The method of claim 1, wherein the value of the stopping time set in step b) is a value that is independent of the vertical speed of the drone.

* * * * *